United States Patent [19]

Dobler

[11] Patent Number: 4,980,804
[45] Date of Patent: Dec. 25, 1990

[54] HEADLIGHT FOR POWER VEHICLES

[76] Inventor: Karl-Otto Dobler, Lahnstrasse 5, 7410 Reutlingen 25, Fed. Rep. of Germany

[21] Appl. No.: 328,937

[22] Filed: Mar. 24, 1989

[30] Foreign Application Priority Data

Apr. 28, 1988 [DE] Fed. Rep. of Germany ....... 3814950

[51] Int. Cl.$^5$ .............................................. B60Q 1/06
[52] U.S. Cl. ..................................... 362/69; 362/273; 362/284; 362/289; 362/428
[58] Field of Search ................. 362/661, 69, 273, 284, 362/285, 287, 289, 322, 418, 423, 428

[56] References Cited

U.S. PATENT DOCUMENTS 4,742,435 5/1988 Van Duyn et al. ............. 362/289 X
4,757,429 7/1988 Ryder et al. .......................... 362/69

Primary Examiner—Stephen F. Husar
Attorney, Agent, or Firm—Michael J. Striker

[57] ABSTRACT

A headlight comprises a reflector, an adjusting device for adjusting a position of the reflector relative to a vehicle chassis, the adjusting device having an actuating element connected with the reflector and a miter gearing adjusting the actuating element, the miter gearing including a driving bevel gear connected with the actuating element and an adjusting bevel gear cooperating with the driving bevel gear, a housing receiving the miter gearing, the adjusting bevel gear having an annular groove, and a movable securing element which engages in the annular groove to secure the adjusting bevel gear and is held in the housing.

16 Claims, 1 Drawing Sheet

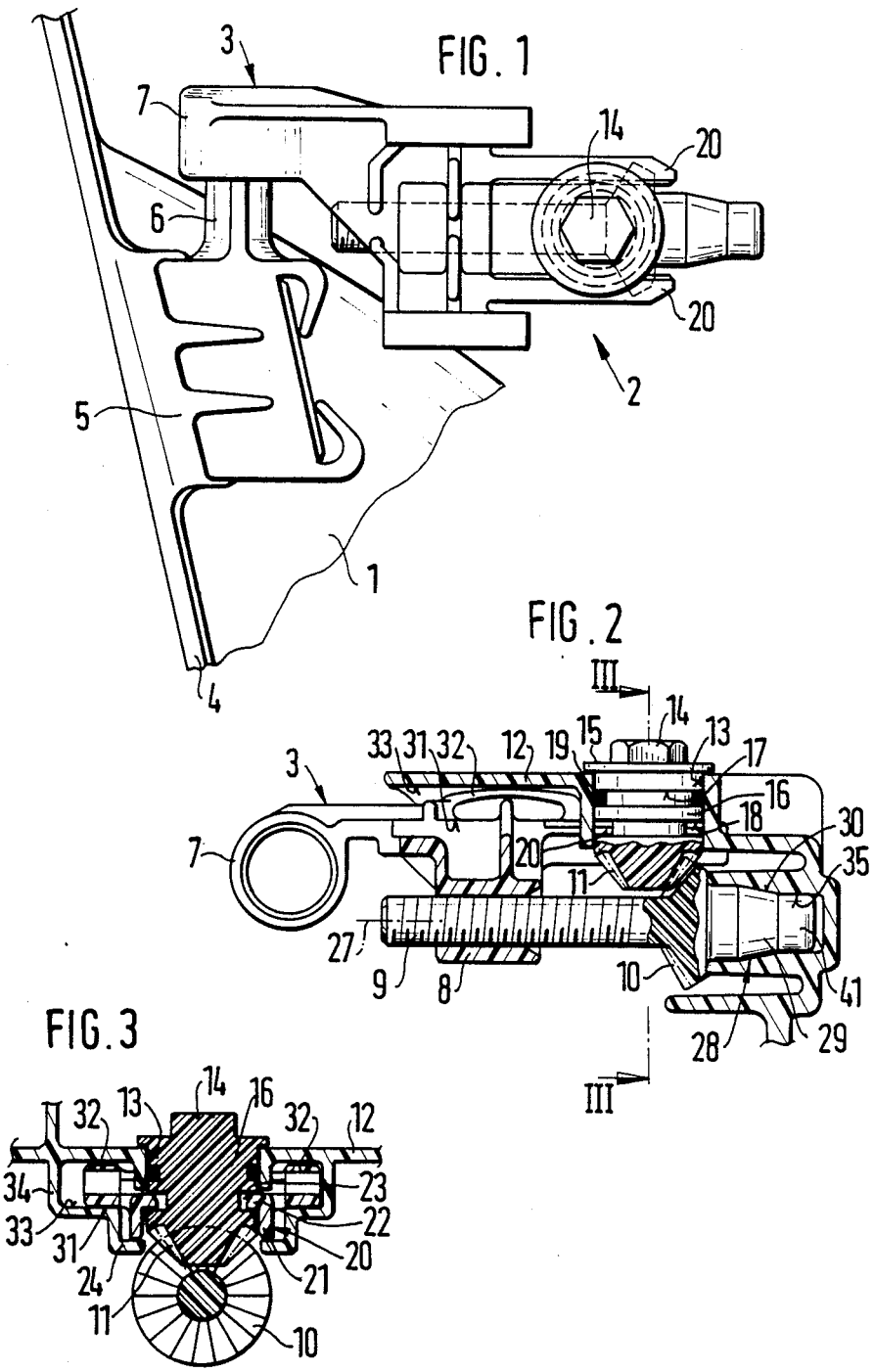

HEADLIGHT FOR POWER VEHICLES

BACKGROUND OF THE INVENTION

The present invention relates to a headlight for power vehicles. More particularly, it relates to a headlight with a reflector supported in a chassis of a power vehicle and provided with an adjusting device for the position of the reflector relative to the chassis, and the adjusting device has an actuating element which is connected at least directly with the reflector and adjustable by a miter gearing.

Headlights of the above mentioned general type are known in the art. One of such headlights, is disclosed, for example in the German document DE-OS 3,525,618. In this headlight the miter gearing includes an adjusting and driving bevel gear arranged in a housing which is closed with a bearing cover. The bearing cover is provided with an opening and a semi-round collar. A cylindrical projection of the driving bevel gear rotates in the opening, and the driving bevel gearing is secured in the axial opening by the bearing cover. The semi-round collar of the bearing cover engages in an annular groove of the adjusting bevel gear and secures the same against axial displacements. The bearing cover is provided with a fixing device for the complicated mounting, and thereby the arrangement of both bevel gears relative to one another is determined. For securing the arrangement of both bevel gears, the screws of the bearing cover are secured against protection by wedging.

SUMMARY OF THE INVENTION

Accordingly, it is an object of the present invention to provide a headlight for a power vehicle, in which the adjusting bevel gear is secured against axial displacement by a self-locking arrangement, so as to make it unnecessary securing the screws by wedging or mounting against rotation.

In keeping with these objects and with others which will become apparent hereinafter, one feature of the present invention resides, briefly stated, in a headlight for a power vehicle in which the adjusting bevel gear is secured by at least one movable element arranged in an annular groove and held in the housing. When the headlight is designed in accordance with these features, it avoids the disadvantages of the prior art and achieves the above specified object.

In accordance with another feature of the present invention the driving bevel gear is provided with a toothing which is arranged opposite to the pin and as holding element the adjusting bevel gear engages in this toothing. These features specify the way with which by the arrangement of the adjusting bevel gear for driving bevel gear a fixed positioning of the driving bevel gear takes place with which no gearing box and cover are needed.

Still another feature of the present invention is that the movable element is formed as a strip which is displaceable into the housing. Therefore, a further alternative is provided for simple axial securing of the adjusting bevel gear.

The strip can be formed as a springy element. Two movable elements formed as strips can engage in the annular groove and the strips can be connected with the actuating element and arranged parallel to the axis of the driving bevel gear. The adjusting bevel gear can snap in an inserting device between the movable elements, which runs perpendicularly to the movable element. In this construction the adjusting bevel gear is fixed by a simple pressing into a movable element without further mounting work and without further safety elements in a housing, thereby the bearing of the drive bevel gear is completed with an axial fixation.

The movable elements in a cross-section can have a longer leg and a shorter leg engageable in the annular groove, and the shorter leg can be provided with a projection extending toward the adjusting bevel gear. The projection can extend parallel to the bevel angle of the adjusting bevel gear.

The actuating element can have guiding surfaces in form of sheet springs which come to abutment against a respective guiding path of the housing. The above mentioned housing can be formed on a housing which receives the headlight. With these features the movable elements due to their arrangement on the actuation element and their construction are such that a simple assembly is insured.

According to a further feature of the present invention, the driving bevel gear can be provided with a toothing arranged opposite to the pin and as holding element engaging the adjusting bevel gear in its toothing. In this construction, due to the advantageous arrangement of the adjusting bevel gear relative to the driving bevel gear, both bevel gears can be brought to a fixed interengaging position without special safety elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a plan view of a miter gearing with a turnably positioned reflector and a turning arrangement in a a spatial view;

FIG. 2 is a view showing a longitudinal section through the miter gearing with the actuating element; and FIG. 3 is a section III—III in FIG. 2.

DESCRIPTION OF THE PREFERRED EMBODIMENTS

FIG. 1 shows a reflector 1 which is supported in a headlight arranged in a not shown chassis. The reflector 1 is adjustable as to its position by means of an adjusting device 2. Either the whole headlight or only the reflector alone can be turned.

The adjusting device 2 has an actuating element 3 which in turn is connected directly or indirectly with the reflector 1. The connection can be composed of a connecting element 5 which is arranged on a reflector edge 4, with a pin 6 or a spherical head mounted on the connecting element and with a spherical trough or a bush-shaped part 7 connected with the mounting element 3 and fitted on the pin or the spherical head.

A thread bush 8 with an inner thread is arranged on the actuating element 3 as shown in FIG. 2. A screw part 9 of a driving bevel gear 10 is screwed in the inner thread and provided with the housing. The driving bevel gear 10 forms together with an adjusting bevel gear 11 a miter gearing. Both bevel gears are supported in a housing which is open toward the actuating element 3.

The adjusting bevel gear 11 is inserted for support in an opening 13 provided in the housing 12. At the side extending in the motor chamber, an outer hexagonal edge 14 is arranged on the adjustment bevel gear 11. After the outer hexagonal edge 14 of the adjusting bevel gear 11, a starting collar 15 is provided. It abuts against the outer side of the housing 12. The starting collar 15 is connected with a cylindrical part 16 which is supported in the opening 13. A first annular groove 17 and a second annular groove 18 are provided in the part 16. The first annular groove 17 is arranged so that with the insertion of the adjusting bevel gear 11 in the opening 13 it is located approximately in the center of the opening depth of the opening 13. An O-ring 19 is inserted in the first annular groove 17 and abuts against the cylindrical part of the opening 13 so as to seal the inner chamber of the housing 12 of the miter gearing. The O-ring 19 leads also to a clamping between the adjusting bevel gear 11 and the opening 13 and increases the self-locking arrangement of these parts which is achieved by the adjusting bevel gear 11, the actuating element 3, and the screw part 9. The second annular groove 18 follows the first groove 17. The cylindrical part 16 merges finally into the toothing of the adjusting bevel gear 11 with a predetermined bevel angle.

At least one movable element 20 engages in the second annular groove 18 of the adjusting bevel gear 11 for its fixing in the opening 13. The element 20 is formed as a laterally springy and thereby movable strip which is connected of one-piece with the actuating element 3. This movable piece extends parallel to the axis 27 of the screw part 9 or the driving bevel gear 10 and in the axial direction of the opening 13 is supported on a guiding path 24 provided in the housing 12. The strip is additionally moved by the relative movement of the actuation element 3 relative to the screw part 9 or displaced in the housing 12 and in the annular groove 18.

The movable element 20 can also be formed as a spring strip which is insertable in the housing 12 and in the second annular groove 18 and not connected with the actuating element 3. However, it is advantageous when the strip 20 or the strips 20 are connected with the actuating element 3 since thereby an additional position securing of the strip or strips can be dispensed with. The strip can also be formed as a rigid and not springy strip which is connected with the actuating element 3. In this case first the adjusting bevel gear 11 is inserted in the opening 13 and then the strips 20 are inserted in the housing 12 by adjustment of the actuating element 3 on the screw part 9. When the strips 20 are formed springy, they can be inserted in the opening 13 before the insertion of the adjusting bevel gear 11. For improved fixation of the adjusting bevel gear 11, also two movable elements 20 can engage in the annular groove 18 and they can be advantageously formed of one-piece with the actuating element 3 and extend parallel in a fork-shaped manner from the actuating element. The movable elements, when they are formed as springy strips 20, have in the housing 12 the required free space radially outwardly extending from the center axis of the adjusting level gear 11. Thereby when the adjusting bevel gear 11 is inserted into the opening 13, the movable elements 20 can be laterally deviated and finally snapped in the annular groove 18. The movable elements 20 are composed of strips with an angular profile provided for the increase of stability and composed of a long leg 21 and a short leg 22 engaging in the annular groove 18. The short leg 22 is provided with a projection 23 which extends to the adjusting bevel gear 11 and facilitates the insertion process of the adjustment bevel gear 11. It is also required that the projection 23 extends parallel to the bevel angle of the adjusting bevel gear 11. For preventing pressing back of the movable element 20 during insertion of the adjusting bevel gear 11 not in the longitudinal direction of the central axis of the opening, two guiding paths per each strip are provided in the housing 12. The end side of long leg 21 on the one hand, and the flank of the short leg 22 on the other hand, come to abutment against the guiding paths.

The movable element 20 secure the adjusting bevel gear 11 against an axial displacement and insures a concrete arrangement of the engaging toothing of the adjusting bevel gear 11 and the driving bevel gear 10 without further working steps or further safety features.

The driving bevel gear 11 has a toothing which is directed toward the screw part 9 axially formed on the driving bevel gear 10. On the other side of the driving bevel gear 10, a pin 28 extends in a coaxial arrangement and is supported in a blind hole 35 of the housing 12. A part of the pin 28 which has a greater diameter merges over a cone 29 into an end piece 41 of reduced diameter. The blind hole 35 is formed as a stepped opening with a shape corresponding to the shape of the pin. It is provided with a conical transition part 30 which corresponds to the cone 29. The driving bevel gear 10 is thereby supported on the one hand with the screw part 9 in the threaded bush 9, and on the other hand in the pin 28 with the housing 12, and has supporting surfaces which face away from one another with the same axis. The axial securing, the end side which faces away of the toothing runs on the housing 12 which surrounds the blind hole 35.

For axial securing, the driving bevel gear 10 is supported on the one side with a toothing on the adjusting bevel gear 10 which serves as a holding element, and on the other side on the housing 12. This arrangement leads to the fact that the adjusting bevel gear 11 and the driving bevel gear 10 are self-locking. The actuating element 3 is axially movable by the miter gearing.

For this axial movement of the actuating element 3 a guide is provided in the housing 23. For this purpose, the actuating element 3 has a supporting part at each side of its longitudinal extension. Guiding surface 31 which lies on one side and parallel to the axis 27 of the screw part 9, and on the opposite side the leaf spring 32 are provided on the supporting part. The leaf springs 32 and the guiding surfaces 31 slide in guiding paths 33 which are formed in the housing. The guiding paths 33 extend parallel to the axis 37 and formed by a U-shaped profile 34. The leaf springs 32 are advantageously formed on the actuating element 3 and form in a section a lense-shaped or oval contour.

The insertion and displacement of the reflector 1 is performed in the following manner. During the mounting, the reflector 1 together with the actuating element 3, the driving bevel gear 10 are inserted, and then the adjusting bevel gear 11 is pressed in the opening 13 and thereby the position of the driving bevel gear 10 with the screw part 9 is axially fixed. After this, a suitable tool is placed on the outer hexagonal edge 14 and turned. This turning of the adjusting bevel gear 11 is transmitted on the driving bevel gear 10 and through its screw part 9 to the actuating element 3 and the reflector 1. By the axial fixation of the driving bevel gear 10, the pulling and pressing forces can be taken up and thereby through the screw part 9 the actuating element 3 which is connected with the reflector 1 and also guided and secured against rotation is displayed.

It will be understood that each of the elements described above, or two or more together, may also find a useful application in other types of constructions differing from the types described above.

While the invention has been illustrated and described as embodied in a headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A headlight, comprising a reflector; an adjusting device for adjusting a position of said reflector relative to a vehicle chassis, said adjusting device having an actuating element connected with said reflector and a miter gearing adjusting said actuating element, said miter gearing including a driving bevel gear connected with said actuating element and an adjusting bevel gear cooperating with said driving bevel gear; a housing receiving said miter gearing, said adjusting bevel gear having an annular groove; and a movable securing element which engages in said annular groove to secure said adjusting bevel gear and is held in said housing.

2. A headlight as defined in claim 1; and further comprising a thread via which said driving bevel gear is connected with said actuating element.

3. A headlight as defined in claim 1, wherein said housing has a blind hole; and further comprising a pin with which said driving bevel gear is radially supported in said blind hole of said housing, and a holding element which engages in an axial direction with said driving bevel gear.

4. A headlight as defined in claim 1, wherein said housing has a bore, said adjusting bevel gear being radially inserted in said housing and provided with an outwardly accessible rotating element.

5. A headlight as defined in claim 3, wherein said driving bevel gear and said adjusting bevel gear are each provided with a toothing, said toothing of said driving bevel gear being arranged opposite to said pin and engaging with said toothing of said adjusting bevel gear as said holding element.

6. A headlight as defined in claim 1, wherein said movable securing element is formed as a strip insertable into said housing.

7. A headlight as defined in claim 6, wherein said strip is formed as a springy element.

8. A headlight as defined in claim 1, wherein said securing element is formed as two movable elements engaging in said annular groove.

9. A headlight as defined in claim 1, wherein said securing element is formed as two movable elements in form of two strips, said strips engaging said annular groove, being connected with said actuating element and extending parallel to an axis of said driving bevel gear.

10. A headlight as defined in claim 8, wherein said adjusting bevel gear is snappable between said movable elements.

11. A headlight as defined in claim 10, wherein said adjusting bevel gear is snappable between said movable elements in a direction perpendicular to said movable elements.

12. A headlight as defined in claim 8, wherein said movable elements have a cross-section with a lower leg and with a shorter leg which engages in said annular groove, said shorter leg being provided with a projection extending toward said adjusting bevel gear.

13. A headlight as defined in claim 12, wherein said projection extends parallel to a bevel angle of said adjusting bevel gear.

14. A headlight as defined in claim 1, wherein said housing has guiding paths, said actuating element being provided with guiding surfaces formed as leaf spring and abutting against said guiding paths of said housing.

15. A headlight as defined in claim 1; and further comprising a main headlight housing, said housing which accommodates said miter gearing being formed on said main housing.

16. A headlight, comprising a reflector; an adjusting device for adjusting a position of said reflector relative to a vehicle chassis, said adjusting device having an actuating element connected with said reflector and a miter gearing adjusting said actuating element, said miter gearing including a driving bevel gear connected with said actuating element and an adjusting bevel gear cooperating with said driving bevel gear; a housing receiving said miter gearing, said adjusting bevel gear having an annular groove; said housing having a blind hole; a pin with which said driving bevel gear is radially supported in said blind hole of said housing; and a holding element which engages in an axial direction with said driving bevel gear; said driving bevel gear and said adjusting bevel gear being each provided with a toothing, said toothing of said driving bevel gear being arranged opposite to said pin and engaging with said toothing of said adjusting bevel gear as said holding element.

* * * * *

UNITED STATES PATENT AND TRADEMARK OFFICE
CERTIFICATE OF CORRECTION

PATENT NO. : 4,980,804
DATED : December 25, 1990
INVENTOR(S) : Karl-Otto Dobler

It is certified that error appears in the above-identified patent and that said Letters Patent is hereby corrected as shown below:

On the title page:

In the heading [73] the name of the assignee should read

-- Robert Bosch GmbH, Stuttgart, Fed.Rep.of Germany--

[30] the foreign application priority data should read

--Fed.Rep.of Germany P 38 14 289.9 filed Apr.28,1988--

Signed and Sealed this

Thirteenth Day of October, 1992

*Attest:*

DOUGLAS B. COMER

*Attesting Officer*     *Acting Commissioner of Patents and Trademarks*